US009223008B1

(12) United States Patent
Hartman et al.

(10) Patent No.: US 9,223,008 B1
(45) Date of Patent: Dec. 29, 2015

(54) LOAD TRACKING AND STABILIZATION

(71) Applicants: Richard L. Hartman, Huntsville, AL (US); Michael K. Balch, Madison, AL (US); Stephen H. Fox, Madison, AL (US); Jonathan A. Berry, Huntsville, AL (US); Stephen R. Granade, Madison, AL (US)

(72) Inventors: Richard L. Hartman, Huntsville, AL (US); Michael K. Balch, Madison, AL (US); Stephen H. Fox, Madison, AL (US); Jonathan A. Berry, Huntsville, AL (US); Stephen R. Granade, Madison, AL (US)

(73) Assignee: Advanced Optical Systems Inc., Huntsville, AL (US)

( * ) Notice: Subject to any disclaimer, the term of this patent is extended or adjusted under 35 U.S.C. 154(b) by 0 days.

(21) Appl. No.: 14/172,870

(22) Filed: Feb. 4, 2014

Related U.S. Application Data

(63) Continuation-in-part of application No. 13/200,732, filed on Sep. 29, 2011, now Pat. No. 8,643,850, which is a continuation of application No. 12/932,664, filed on Mar. 2, 2011, now Pat. No. 8,749,797.

(60) Provisional application No. 61/387,515, filed on Sep. 29, 2010, provisional application No. 61/339,259, filed on Mar. 2, 2010, provisional application No. 61/778,333, filed on Mar. 12, 2013.

(51) Int. Cl.
*G01B 11/14* (2006.01)
*G01S 5/16* (2006.01)
*G01S 1/70* (2006.01)

(52) U.S. Cl.
CPC .. *G01S 5/163* (2013.01); *G01S 1/70* (2013.01)

(58) Field of Classification Search
CPC ............ G01S 5/00; G01S 1/00; B66C 13/00; B66C 23/00; B66C 2700/00; B66C 1/00; B66C 3/00; B66C 21/00; Y04S 30/00
USPC .................................. 356/614, 623
See application file for complete search history.

(56) References Cited

U.S. PATENT DOCUMENTS

| 4,178,591 | A * | 12/1979 | Geppert ........................ 340/685 |
|---|---|---|---|
| 6,549,139 | B2 * | 4/2003 | Shaw, Jr. ...................... 340/685 |
| 8,643,850 | B1 * | 2/2014 | Hartman et al. ............. 356/614 |
| 2003/0214415 | A1 * | 11/2003 | Shaw ............................ 340/685 |
| 2009/0133467 | A1 * | 5/2009 | Mori et al. .................... 73/1.77 |
| 2009/0152391 | A1 * | 6/2009 | McWhirk ...................... 244/30 |
| 2010/0070179 | A1 * | 3/2010 | Cameron ...................... 701/301 |
| 2010/0073363 | A1 * | 3/2010 | Densham et al. ............. 345/419 |
| 2010/0097183 | A1 * | 4/2010 | Pollema et al. .............. 340/10.1 |
| 2011/0010023 | A1 * | 1/2011 | Kunzig et al. .................... 701/2 |
| 2011/0191025 | A1 * | 8/2011 | Maynard et al. ............. 701/301 |

* cited by examiner

*Primary Examiner* — Tarifur Chowdhury
*Assistant Examiner* — Isiaka Akanbi
(74) *Attorney, Agent, or Firm* — Mark Clodefelter

(57) ABSTRACT

A method for stabilizing a load suspended with a rope, cable, net, sling or the like is disclosed. A beacon having a plurality of lights thereon may be attached to the load relative to the attachment point to the load, to an attachment point of the load or to the rope, cable sling or the like. A sensor on the lifting device senses the beacon and thus any swinging motion of the load, and a processor responsive to the sensor develops control signals that direct motion of the lifting device to dampen any swinging motion of the load.

20 Claims, 15 Drawing Sheets

LOAD TRACKING AND STABILIZATION

CROSS REFERENCE TO RELATED APPLICATIONS

This application is a continuation-in-part application of Applicant's U.S. Pat. No. 8,643,850, issued Feb. 4, 2014, incorporated herein by reference, which is a continuation-in-part of Applicant's patent application Ser. No. 12/932,664, filed Mar. 2, 2011, also incorporated herein by reference, and which claims the benefit of Applicant's provisional application No. 61/339,259, filed Mar. 2, 2010, incorporated herein by reference, and further claims the benefit of Applicant's provisional application No. 61/387,515, filed Sep. 29, 2010, also incorporated herein by reference. The instant application also claims the benefit of Applicant's provisional application No. 61/778,333, filed Mar. 12, 2013, which is incorporated herein by reference.

FEDERALLY SPONSORED RESEARCH

This invention was made with partial government support under contract no. W911W6-08-D-0007 and W911W6-10-C-0068.

FIELD OF THE INVENTION

This invention relates to loads carried or moved by lifting devices using cables or lines connected to the load, and particularly to methods for detecting and stabilizing a swinging load.

BACKGROUND OF THE INVENTION

Helicopters pick up external loads by connection of a sling to a hook on the helicopter. The cargo sling itself may be attached, or a long line used between the helicopter and the sling. Lines might vary in length from just a few meters to 100 meters or more.

The speed at which a helicopter can fly with a load suspended therebeneath by a cable or the like is limited by the long cable and the load, and the helicopter's innate speed capability. Loads can become unstable, and swing wildly an any direction. Instability and swinging of the load is worse when loads are relatively light. In extreme cases, a load can rise far enough behind the helicopter so that the cable suspending the load may become entangled in the rotors or airframe, causing the helicopter to crash.

Pilots can counteract swinging of a suspended load by visually tracking the load or feeling the load's swing through the helicopter's control system. However, this is distracting to a pilot, and is more difficult to sense and counteract in newer fly-by-wire helicopters. In the instance of computer controlled drone helicopters, the computer cannot feel what the load is doing and needs a way to track the load to counteract its swing.

The same problems related to swinging of a load suspended from a helicopter apply to using a helicopter to engage a load on the ground without having a person on the ground to physically hook the load to the helicopter. When not using a person on the ground, the helicopter must be used to move a hook on the end of a line into the exact right position to snag a load. Without a way to track the hook at the end of the cable or line underneath the helicopter, it may take many attempts to snag the load, which takes time and may be dangerous, particularly in military and combat applications.

Similar circumstances apply to a crane lifting and moving a load. Here, since vision of the operator may be obstructed in a construction situation, it may be impossible for a crane operator to engage a load with a crane hook without assistance.

In order to meet the above and other objectives, the present invention is a method of tracking the end of a line beneath a helicopter, crane, or other means of lifting loads. Its primary purpose is providing information to an operator related to the location of a load suspended by a cable or line so that an operator will know if the load is swinging or begins to swing. In addition, the instant invention allows for manual or automated stabilization of a load at the end of a line, keeping it from swinging dangerously, and to allow a grapple or hook, which may be an automated grapple, at the end of the line to be guided to a load to pick it up autonomously. More particularly, the present invention includes a sensor that detects a beacon attached to or near the end of the line, or near or at the load, and uses a processor to extract the position of the beacon, and thus the end of the line and thus location of a load, grapple or hook, from the sensor data.

Advantageously, the tracking system of the invention includes multiple sources of light in the beacon to improve redundancy and allow for one or more of the light sources to fail or to be hidden by the line connecting the means of lifting to the load.

DETAILED DESCRIPTION OF THE DRAWINGS

In the following paragraphs, the present invention will be described in detail with reference to the attached drawings. Throughout this description, the disclosed embodiments and features are to be considered as examples, rather than being limitations to the invention. Further, reference to various embodiments of the disclosed invention does not mean that all claimed embodiments or methods must include every described feature. As should be apparent to those skilled in the relevant arts, the various disclosed embodiments and features of the invention may be used separately or together, and in any combination.

The functions of some of the various embodiments may be provided through the use of dedicated hardware, such as dedicated processors, firmware, or by non-dedicated hardware, such as a laptop computer, tablet computer, a "smart" cellular device integrated with GPS, or any other computing device of sufficient computational power, as would be apparent to one of ordinary skill in the art. Likewise, any required operating system of sufficient speed and "real time" capability can be used with any processor requiring an operating system, also as would be apparent to one of average skill in the art. Similarly, any switches shown in the figures and described in the specification may conceptual only, and may be implemented by program logic, through dedicated logic, through the interaction of program control and dedicated logic, or even manually, depending on how the various embodiments are configured.

Figure 1:
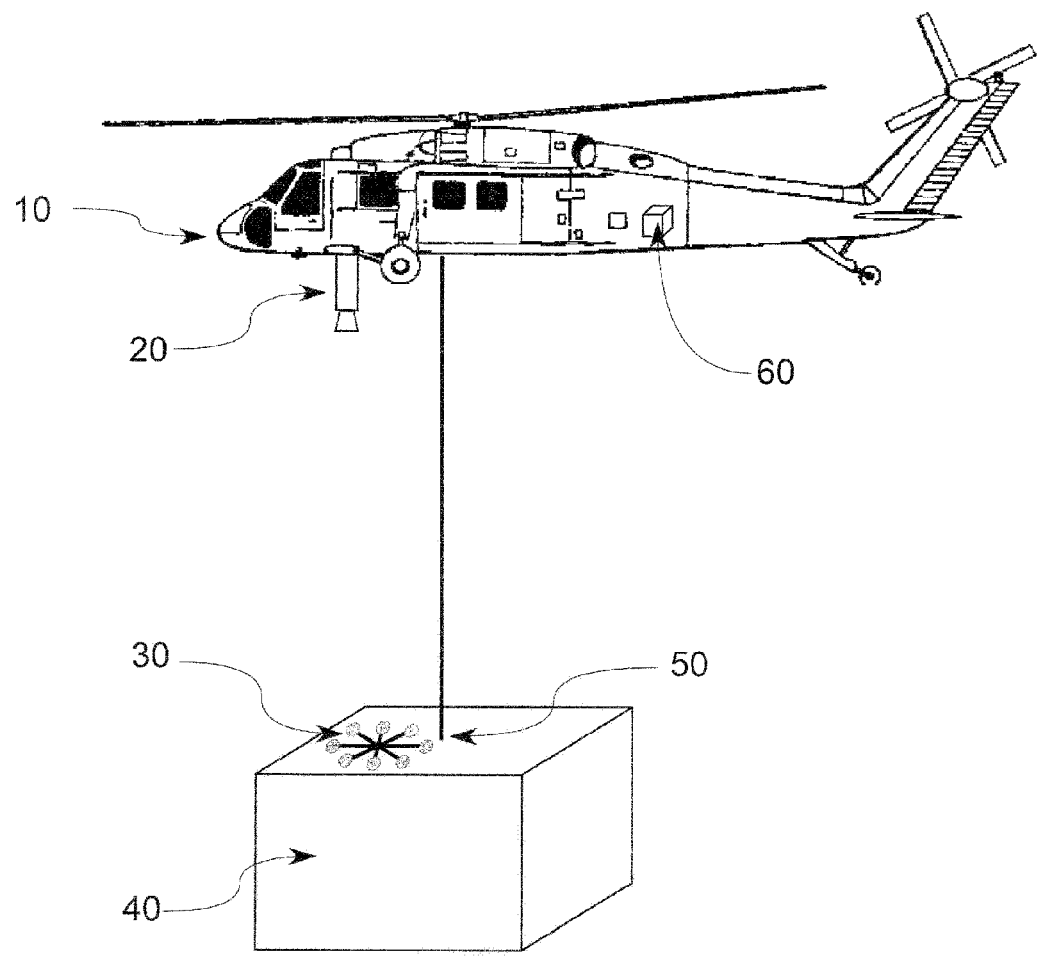
FIG. 1 diagrammatically shows the line tracking system of the invention.

One embodiment of the invention for tracking the end of a line is illustrated in FIG. 1. A lifting apparatus 10, which may be a helicopter, but which also may be a crane or any other such device for lifting and moving loads with a cable or line, is shown. Where the lifting apparatus is a helicopter, the load may be carried by a sling, net or ropes, webbing or the like attached to the load. Typically, a length of the rope, cable, webbing or the like that supports the load is from 30 to 150 feet or so, although other lengths may be used. In embodiments where the length of such rope, webbing, sling etc. between the attachment point of the helicopter and an attachment point of the load is known in advance, simple geometric calculations allow calculation of angles of the rope, webbing, sling etc. with respect to the helicopter. Here, the calculated angles are indicative of extent of swinging of the load. In other embodiments, where the field of view of the camera, or the pixel array, is of a known size and configuration, such as a coordinate system, swing angles may be calculated by comparing swing of the load with respect to a sensor field of view. In other embodiments where the beacon size or size of a reference on the beacon is known, the extent and direction of swinging of the load may be determined by comparison to the beacon size and location. In other words, where the beacon is circular and three feet in diameter, excursions of the load from a center, or plumb location of the load, may simply be compared to the diameter of the beacon as it appears on the sensor in order to determine extent of swinging of the load.

A sensor 20 is attached to helicopter 10 in a position to observe the line beneath helicopter 10, and an area around the line where the load lifting point would reasonably expected to be when the load is being picked up, lowered to a surface and being transported. A beacon 30 is associated with load 40 or a lifting point of load 40 near an end of line 50, such as beacon 30 being attached to or built into the load 40, or built into or attached to a load lifting point, such as a hook, clevis, automated grapple, a receiver for the grapple or even attached to or integrated into the rope, webbing, sling etc. itself. In any case, beacon 30 is positioned to reference the location of an end of the rope, cable, sling or attachment point of the load. In other embodiments, the beacon may additionally reference a height of the attachment point from the ground, so that a load is not lowered excessively fast, which may damage the load, and for providing instrumentation to an automated control system to indicate when an automated grapple should engage an automated receptacle. In some embodiments, beacon 30 is attached or otherwise associated with load 40 at a known location and distance with respect to an attachment point of line 50 to load 40. As such, and in these embodiments, beacon 30 does not move with respect to load 40 as the load is moved, and beacon 30 may serve as a reference for location of the attachment point between the load and line from which the load is suspended. A processor 60 is located on helicopter 10, and is coupled to sensor 20 so as to receive at least position information of the load relative to sensor 20 and helicopter 10.

As shown in FIG. 1, sensor 20 detects beacon 30 and passes its information to processor 60. The processor 60 locates the beacon 30 in the information from sensor 20 and, from that information, calculates the location of the end of the line 50 beneath helicopter 10 based on the known location of beacon 30 relative to the end of the line 50. It then delivers the location of the end of the line 50 to helicopter 10 via processor 60. In some embodiments, sensor 20, beacon 30, and processor 60 may automatically or semi-automatically control helicopter 10 to stop the load 40 from swinging. Such control may be built into a drone helicopter that is autonomously guided by GPS to pick up a load and carry the load to a predetermined location, or built into a remotely piloted helicopter or by a piloted helicopter.

Figure 2:
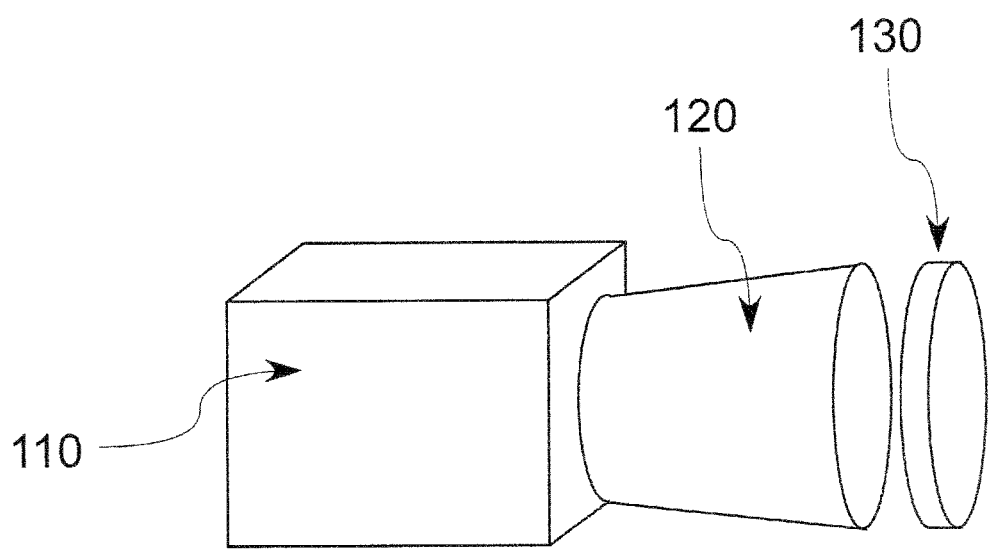
FIG. 2 diagrammatically shows, by way of example only, a sensor that detects the beacon of the invention.

Sensor 20 is illustrated in FIG. 2. Sensor 20 may be an image capturing device, such as a camera or the like 110 that captures images nominally at a frame rate of between 10 and 30 frames a second, but which in some embodiments may have a higher frame capture rate, as dictated by design requirements for accuracy and field-of-view. A lens 120 serves to conventionally focus images onto a digital array, such as a CCD or other digital capture array, the resolution of which being dependent on at least the length of line 50 in order to discriminate each light of beacon 30 at the end of line 50. However, in many embodiments, brightness of the beacon lights and sensitivity of the sensor are selected so that sensor 20 is capable of at least detecting the lights of the beacon from a further distance, such as 300 yards or so, in order to approach a load and accurately position a hook, clevis, automated grapple or other load-engaging device in close proximity or engaging relation therewith. In some embodiments, a light filter 130 may be provided, and which may be a narrow band-pass filter designed to pass wavelengths associated with beacon 30, and reject other wavelengths of light.

Figure 3:
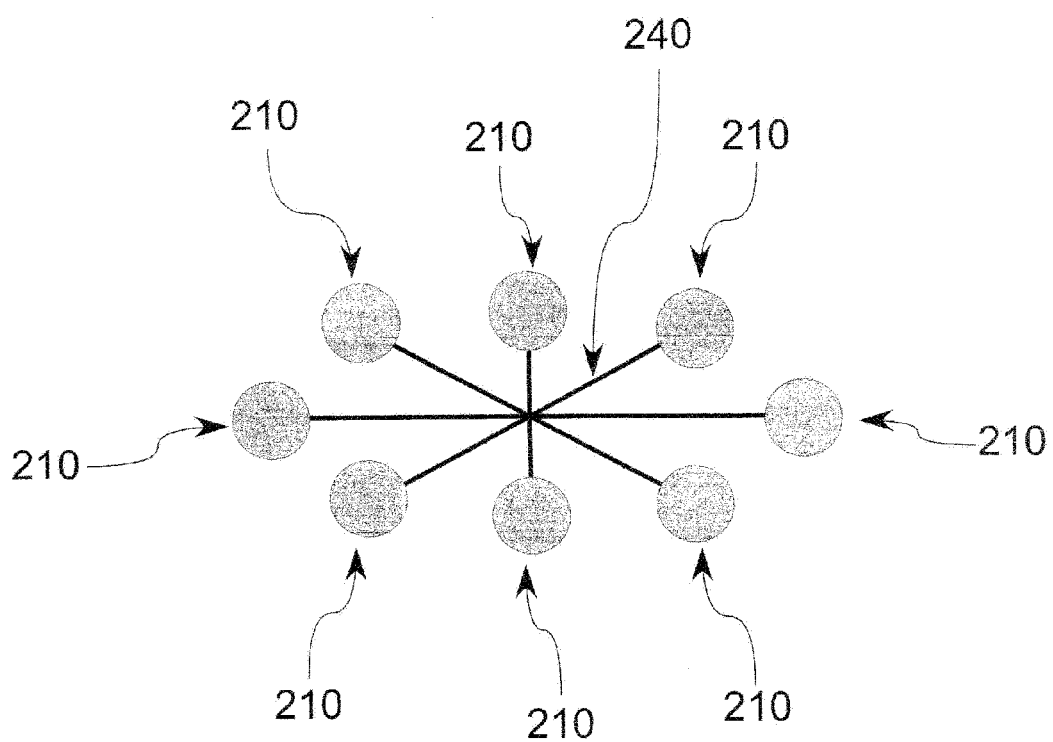
FIG. 3 diagrammatically shows, by way of example only, a beacon of the invention.

One embodiment of a beacon 30 is illustrated in FIG. 3. Here, in some embodiments, multiple sources of continuously illuminated light 210 are disposed on a mounting body 240 in a known pattern, such as, by way of example only, may be a circular or oval pattern of a plurality of lights 210. Lights 210 may be solid state lights, such as LED or laser diode lights, incandescent or fluorescent lights, which lights being powered by a battery (not shown) built into mounting body 240, or lights 210 may be non-electrically powered lights, such as bioluminescent lights, or reflectors illuminated by a light source mounted to the helicopter. While 8 such lights are shown, more or fewer lights may be used. As described above, mounting body 240 is configured to be fixed to a load 40, as by hook-and-loop tape, wire, cord, elastic cord or the like between anchor points on the load and anchor points built onto mounting body 240. Body 240 may be as small as 10 inches to 12 inches or so, as will be further explained, or as large as three feet or larger, depending on the size of the load and requirements of the system. As such, where beacon 30 is circular, its diameter may range from several inches in diameter to several feet in diameter. Also and as noted, different shapes of a beacon may be used to allow discrimination between when a load is swinging and when a load is rotating about the load attachment point. Here, if the beacon is not circular and is placed on the load in a known orientation, then the orientation of the beacon may be used to discern whether the load is swinging or rotating. Likewise, if a circular beacon has all lights continuously illuminated except for one, which may be a flashing light or a light that is "off", then orientation of the flashing or "off" light in the circular arrangement of lights may be used to discern rotation of the load about an attachment point as opposed to swinging of the load. In yet other embodiments of a circular beacon with a circular array of lights, the lights may be independently switched "on" or "off", or blinking or not blinking, in order to create a unique pattern of lights for a particular load so as to associate any particular load with a particular destination. Of course, and as noted, the beacon need not be circular, it can be linear, orthogonal or any other shape that will allow at least a rotation of the load about the lifting point to be discriminated from swing motion of the load, and possibly to allow different loads to be separately and independently identified from within a plurality of loads. The above embodiments allow for the beacons to be inexpensively produced, as they would be no more complicated than an array of lights, each of which having a switch, and perhaps a blinker, to switch the respective light "on", "off" or to a blinking mode. This type of beacon would be advantageous in that it is inexpensive and requires manufacture of only one type of beacon that can be manually configured for many different applications.

Figure 12:
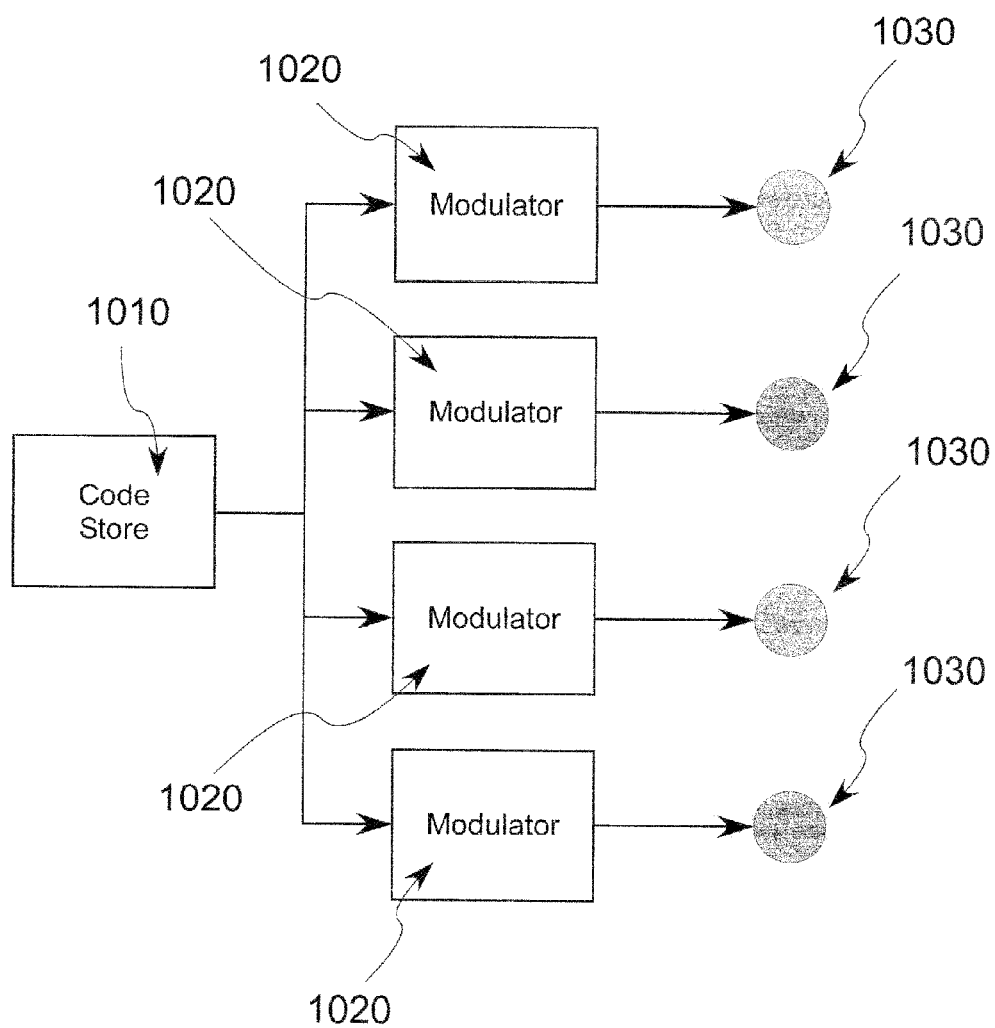
FIG. 12 shows an embodiment of the beacon of the invention.

Referring to FIG. 12, a block diagram of another embodiment of a beacon 30 is shown. Here, multiple codes from a selection of codes stored in code store 1010 are transmitted to multiple modulators 1020. These modulators power multiple light sources 1030, one modulator 1020 for each light 1030, the modulators selected to be capable of modulating lights 1030 at a highest desired modulation frequency. While FIG. 12 shows four light sources, fewer or more may be used in this embodiment of the beacon. The light sources may each be modulated using a code, such as a frequency code wherein each light source is modulated at a different frequency in order to precisely locate each beacon. Electrically, the signal to respective lights on the beacon may be a square wave wherein the square wave to each beacon is modulated independently from other beacons and at a different frequency. The frequencies may be selected so that there are no harmonic frequencies between the lights. In other embodiments, a more complex code may be used that is designed for maximum correlation and minimum cross correlation, such as a Kasami code.

The field of view of sensor 20 may be arranged as a coordinate system, which in the case of a CCD array or other similar image capture device, is already established due to pixels in the array being arranged in rows and columns, with a center of the field of view of sensor 20 typically corresponding to a point directly below helicopter 10 where beacon 30 would be with the load hanging straight down. One direction perpendicular to one of the rows and columns may be aligned with the long axis of a helicopter, or a selected orientation of another type lifting device. As such, in one embodiment, beacon 30 may be mounted to load 40 offset from the attachment point between line 50 and load 40 by a distance and direction corresponding to a distance and direction offset between sensor 20 and a winch or other attachment point of the line to the helicopter. In other words, if sensor 20 is mounted to helicopter 10 five feet in front of where line 50 attaches to helicopter 10, then beacon 30 may be mounted to load 40 in a corresponding location five feet forward of where line 50 attaches to load 40. In this instance, and where an automated grapple system is used to engage the load, the helicopter would need to approach the load from the right direction in order to accurately engage the grapple with the load. However, placing the beacon on the load directly beneath the beacon sensor is not a requirement, and in some embodiments the beacon may be mounted anywhere on the load without knowledge of orientation with respect to the lifting point of the load. In other embodiments, the distance and direction between the beacon and lifting point on the load is provided a priori to processor 60 to reduce computational load of the processor. In these embodiments, when mounting the beacon to the load, the distance between the lifting point on the load to where line 50 is attached and a reference point of the beacon, such as the center of the lights where the lights are arranged in a circle, is measured, and relative location of the beacon, such as in front, behind, or port or starboard relative to the lifting point is noted, and this information provided to processor 60. Such information allows an autonomously operated helicopter to be guided to engage an automatic grapple attached to the line to a corresponding grapple-engaging device on the load. In other embodiments, as will be explained, the beacon is placed directly on a grapple, hook, clevis or other attachment device, eliminating any need to measure offset and direction between the beacon and lifting point.

Figure 11:
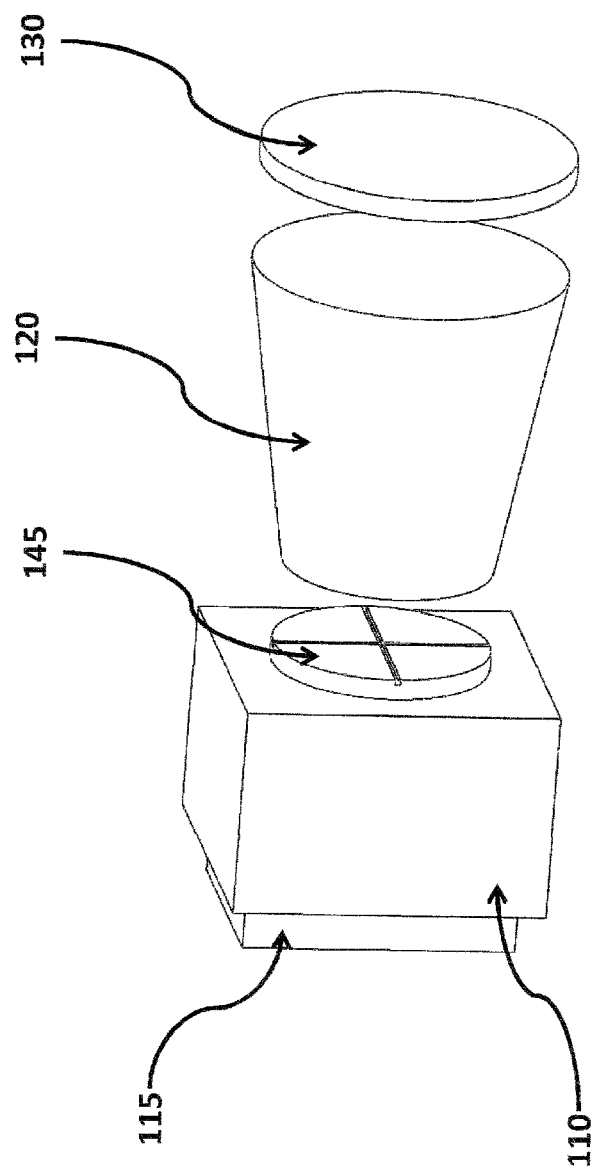
FIG. 11 shows another embodiment of a sensor of the invention.

In another embodiment of a sensor, FIG. 11 shows a sensor 110 that does not utilize image capturing. In this example, the focal plane of lens 120 is occupied by a quadrant detector 145. Filter 130 is as described for sensor 20 of FIG. 2. The rest of the sensor is processor 115 that determines vertical and horizontal position of a spot of light from the output of the quadrant detector, as is well known in the art. Here, lens 120 places the light source of the beacon that is in the len's field of view at a particular location on the quadrant detector. Where that spot or spots are located on the plane of the quadrant detector is interpreted as a relative position of the beacon in space.

Figure 4:
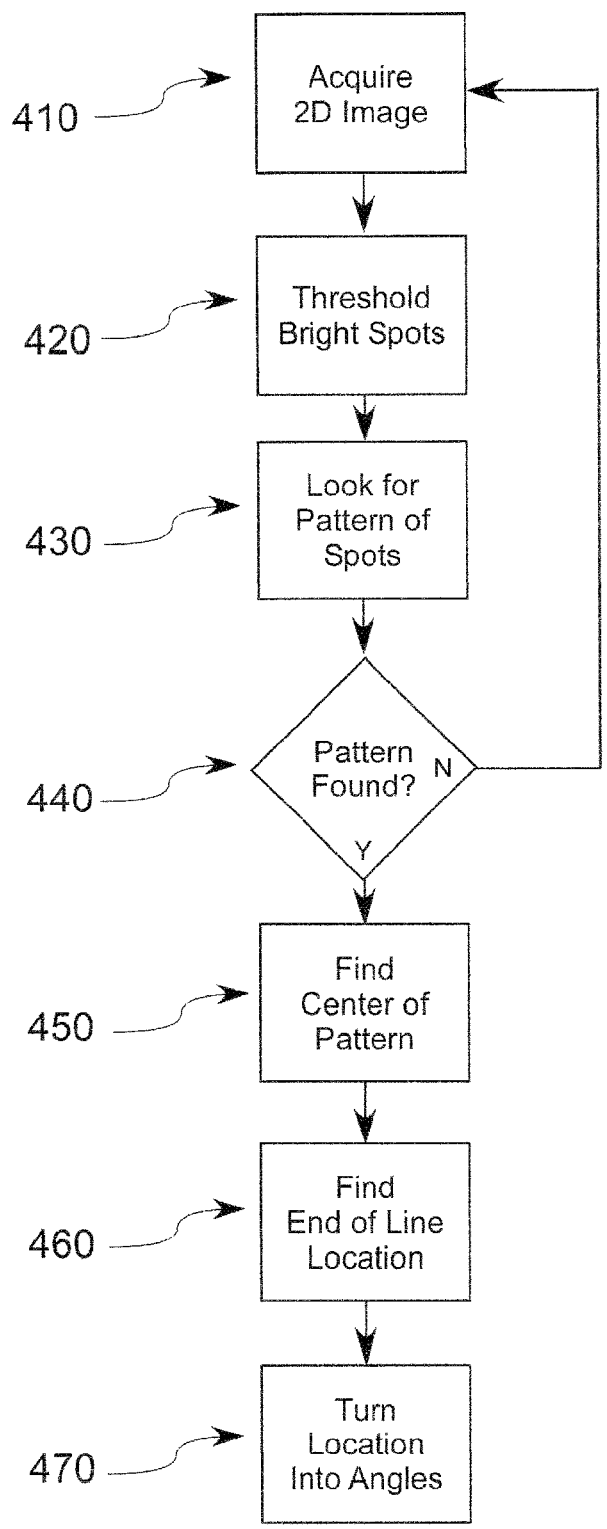
FIG. 4 shows, by way of example only, a block diagram of one possible algorithm of the invention.
Figure 6:
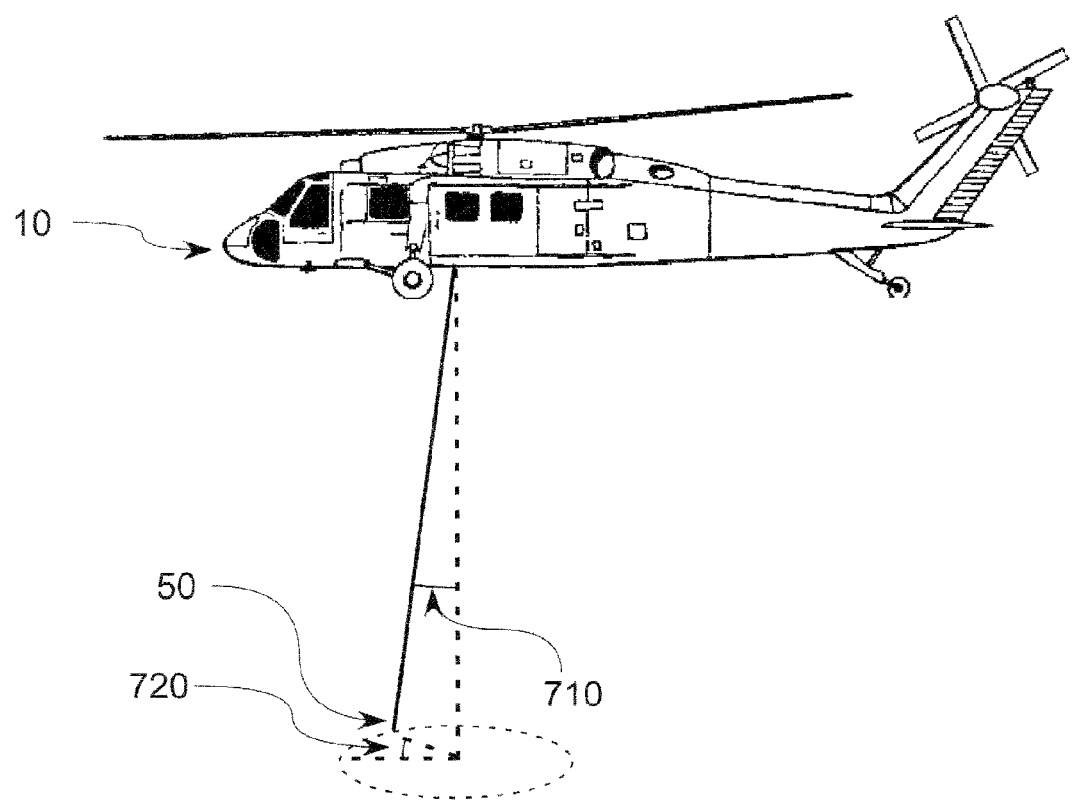
FIG. 6 shows an angular calculation that the algorithm of FIG. 4 calculates.

Referring to FIG. 4, Processor 60 uses an algorithm to locate the spots of the lights of beacon 30 and then finds the center of the spots. Using the center of the spots of lights, the algorithm calculates the two angles that describe the location of the beacon 40 relative to the sensor 20. FIG. 6 shows the two angles 710 and 720 that the algorithm calculates. Initially, at box 410 of FIG. 4, a two-dimensional image is obtained by sensor 20, the image containing a view of beacon 30, which image provided as an input to processor 60. As noted, light filter 130, where used, serves to block most extraneous light and pass the selected wavelengths of lights 210. In some embodiments, infrared wavelengths may be used, but any other desired wavelengths may be used, depending on design requirements, ambient light sources in the environment, etc. Here, there may be several types of beacons that provide different wavelengths of light from which a selection may be made depending on the environmental lighting, or the beacons may each incorporate lamps that provide the different wavelengths, with a switch selecting which wavelength to use. The filter 130 on the camera would then be changed to correspond to the wavelengths of light provided by the beacons. The filtered image is then applied to a threshold function at box 420, which ensures that lights 210 are not obscured by dust or flying debris. As such, the threshold is set at a level, such as 50% or so, of the brightness of lights 210 as observed from a distance corresponding to a helicopter 10 approaching load 40 in preparation for picking up the load. Such a threshold would eliminate most point sources of extraneous light, and may be adjusted by an operator, or automatically adjusted on-the-fly by a light level sensor to compensate for various ambient lighting conditions. Points of light sufficiently bright so as to exceed the threshold are examined at box 430 as to whether they are in a pattern corresponding to the pattern of lights on beacon 30, and verifies whether the pattern is a possible pattern of a beacon. Correlation processes similar to those as disclosed in Applicant's prior incorporated patents and applications may be used to identify the various patterns that are possible when the beacon is viewed from the helicopter.

Where the lights are arranged in a circular pattern, as shown in FIG. 3, the circle may be seen as being in various elongated shapes as the helicopter approaches, and transition to a circular pattern when the helicopter is nearly overhead. For guiding the helicopter to such a general location, the use of GPS would suffice. At box 440, the question is asked whether a pattern matching a beacon on the load to be engaged by the helicopter has been found, and if not, the logic flow loops back to box 410 to acquire a new or the next image. As noted above, this process operates with sufficient speed so as to process 15 to 30 frames or so per second in order to dampen the swinging of a load or accurately engage a connecting device to the load. If a verifiable pattern indicative of a beacon is found, the logic flow at box 440 falls through to box 450, where a center of the pattern, which is indicative of a center of the beacon, is calculated, after which the logic flow falls through to box 460 where the known offset between the center of the beacon and the load lifting point, or attachment point of the line to the load, is applied, and the attachment point thus located. It is noted that the center of the beacon is merely one reference point, and not necessarily the required reference point. Where the sensor is a camera having an array of light-sensing pixels, and the beacon size is known, then the beacon size itself may be used as a reference to calculate distance of the load from the helicopter, distance of the beacon from an attachment point on the load, the offset, as well as extent of swing of the load and direction of swing of the load. For instance, where the beacon size or a reference portion of the beacon is 3 feet, and such beacon or reference point occupies, for example, 100 pixels on the pixel array of the sensor at a known distance, then any distance of the attachment point of the load from the helicopter may be calculated, or simply taken from a lookup table without knowing the line length in advance. When the length of line is known or ascertained, extent of swing of the load from a plumb position where the load is hanging straight down may be calculated. As such, in the aforementioned example of the beacon or reference portion thereof being three feet, and occupying 100 pixels with a distance of 50 feet between the helicopter and attachment point, then a swing of the load from side to side across the center point over 600 pixels of the array would represent a swing of 18 feet from side to side. From that information, control signals can be developed that counteract the swing in extent and direction. Other methods for calculating swing angles are disclosed in Applicants provisional application No. 61/778,333, filed Mar. 12, 2013, incorporated herein in its entirety by reference.

At box 470 calculations are made to derive angle 710 (FIG. 6) of the line with respect to a horizontal axis of helicopter 10, as may be obtained from helicopter or other instrumentation, and angle 720, an angle representative of angular displacement of the load with respect to a longitudinal axis of helicopter 10. Such calculations may be made by knowing the length of line 50, the extent, or distance, to which the end of line 50 has deviated from the center of the field of view of the sensor, which corresponds to distance from a plumb position that the load is hanging, and the direction of the deviation of the end of line 50 from a straight ahead reference orientation of the helicopter. These angles are indicative as to extent of swinging of the load with respect to the helicopter, or extent of swinging of a grapple, hook or the like that is about to be engaged with a load.

In other embodiments, such as where a quadrant detector is used as the sensor, the center of the field of view of the quadrant detector may be designated as the point where end of line 50 is when it is in a plumb position. Outputs from the quadrant detector may then be used to detect deviations of the end of line 50 from the center position on the quadrant detector and generate control signals to the helicopter that steer the helicopter in the direction of the deviation in order to maintain the load in the center of the field of view of the quadrant detector. In addition, certain positions of the load may be ignored or discounted, such as during transit when the helicopter is tilted forward, the sensor may be looking behind the load. Another ignored or discounted position of the load may be when the helicopter is decelerating, the load swings forward slightly due to inertia. Here, as the helicopter decelerates, the load would swing slightly forward, and then move back to a center position as the helicopter slows to a hover. In these situations, control signals from the load stabilization system may be discounted, or the extent of control reduced. In addition, weighing functions may be used at certain times to govern sensitivity of the load stabilization process. For instance, during transit it may be acceptable to allow the load to swing slightly, as opposed to when automatically engaging a load, where placement of an automated grapple would not allow any swinging of the grapple. Likewise, when the load is being lowered, swinging of the load would be eliminated. Times when load stabilization may be set to be more effective or less effective may be governed by GPS, thus instructing the control system of a pilotless helicopter to provide more stabilization at a location where a load is picked up and a location where a load is delivered, and less stabilization when transporting a load, thus saving fuel and preventing excessive wear and tear on the helicopter when in transit by preventing continuously occurring, small stabilization maneuvers that have no bearing on the safe transport of the load.

Figure 5:
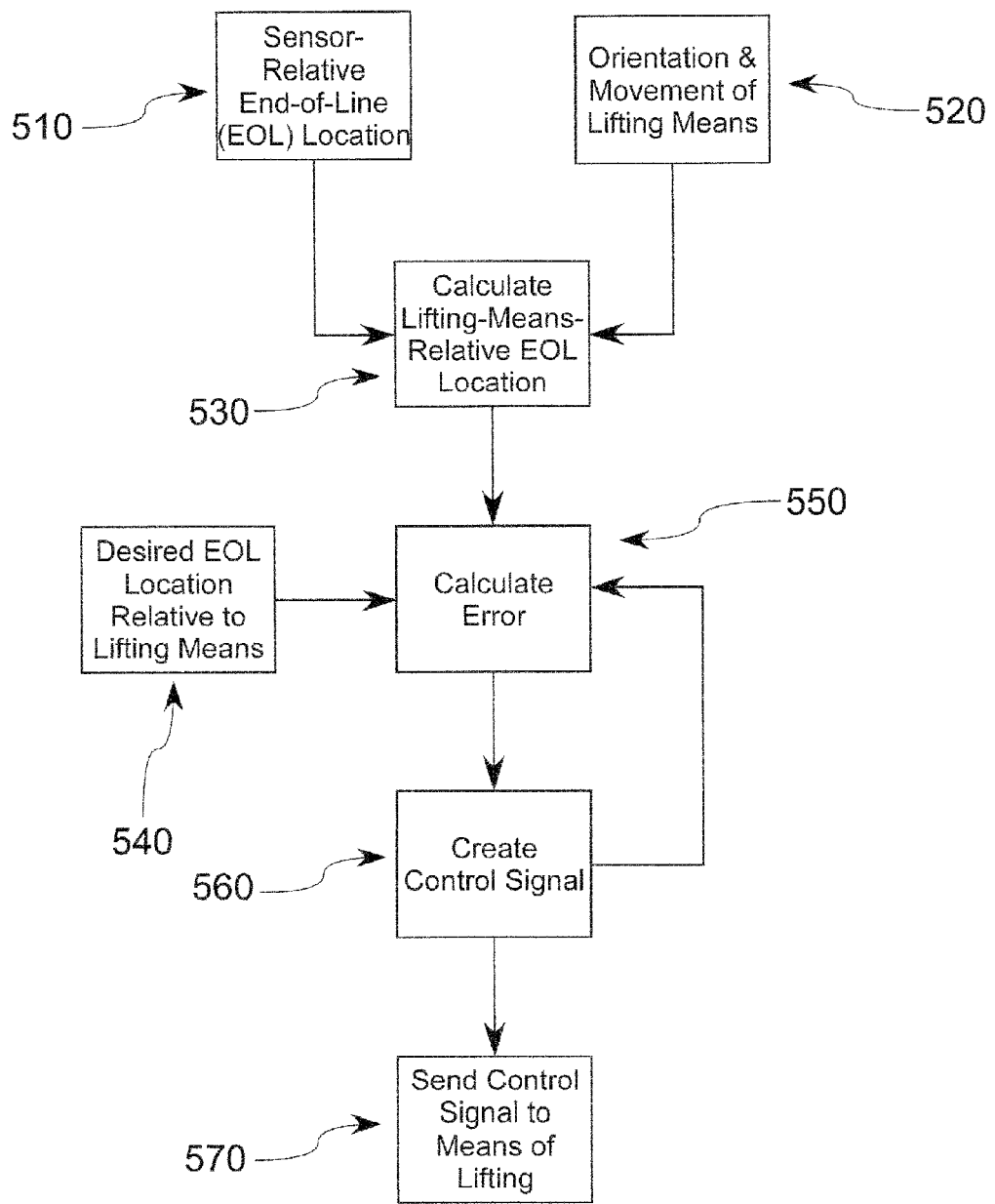
FIG. 5 shows a block diagram of another possible algorithm usable to stabilize the end of the line and keep it from swinging.

The algorithm of FIG. 5 illustrates one way of using the relative location and information about movement and control of helicopter 10 in order to decrease or eliminate swinging of load 40. The algorithm of FIG. 5 is appropriate in the case where the control system of helicopter 10 accepts additional control signals to move the helicopter 10 to drive calculated error signals to zero and thus stop the load 40, or a grapple, hook or the like attached to the end of line 50, from swinging. This is accomplished by moving the helicopter, or other lifting device such as a crane, in the same direction and extent that the load or grapple swings. In other words, if the load swings 10 feet to one side, the algorithm detects the extent of the swing by calculating angle 710 (FIG. 6), and the direction of the swing by calculating angle 720, and moves the helicopter in the direction of angle 720. In some embodiments where the helicopter cannot react as quickly as the load swings, it may take several corrective maneuvers to fully dampen swinging or a load or connection device.

Referring to FIG. 5, at boxes 510 and 520, and for each video frame or the like taken from sensor 20, the location of the attachment point of the load to line 50, as determined at box 460 of FIG. 4, and angles calculated at box 470 of FIG. 4, and orientation and movement of the helicopter, as determined by the helicopter's Inertial Measurement Unit (IMU) are provided to box 530 of FIG. 5. At box 530, location of the lifting point or point of attachment of the load to line 50 relative to the helicopter is calculated, thus deriving extent of swinging of the load. The result of the calculation at box 530 along with the desired end of line location relative to the helicopter from box 540 from the geometrical location of the sensor relative to the point of attachment is provided to box 550, where a calculation is performed to create an error signal. This error signal is indicative of a difference between where the attachment point, grapple, hook or the like is at when the particular image or image frame was obtained, and where the attachment point, grapple, hook or the like should be for any particular operation, such as engaging and picking up a load, transporting a load or lowering a load to a surface. At box 560 the required control signals to helicopter 10 to stabilize the load are calculated. At box 570 the calculated control signals are sent to the helicopter control system in order to move it in directions to stop the load, grapple, hook or the like from swinging.

Figure 7:
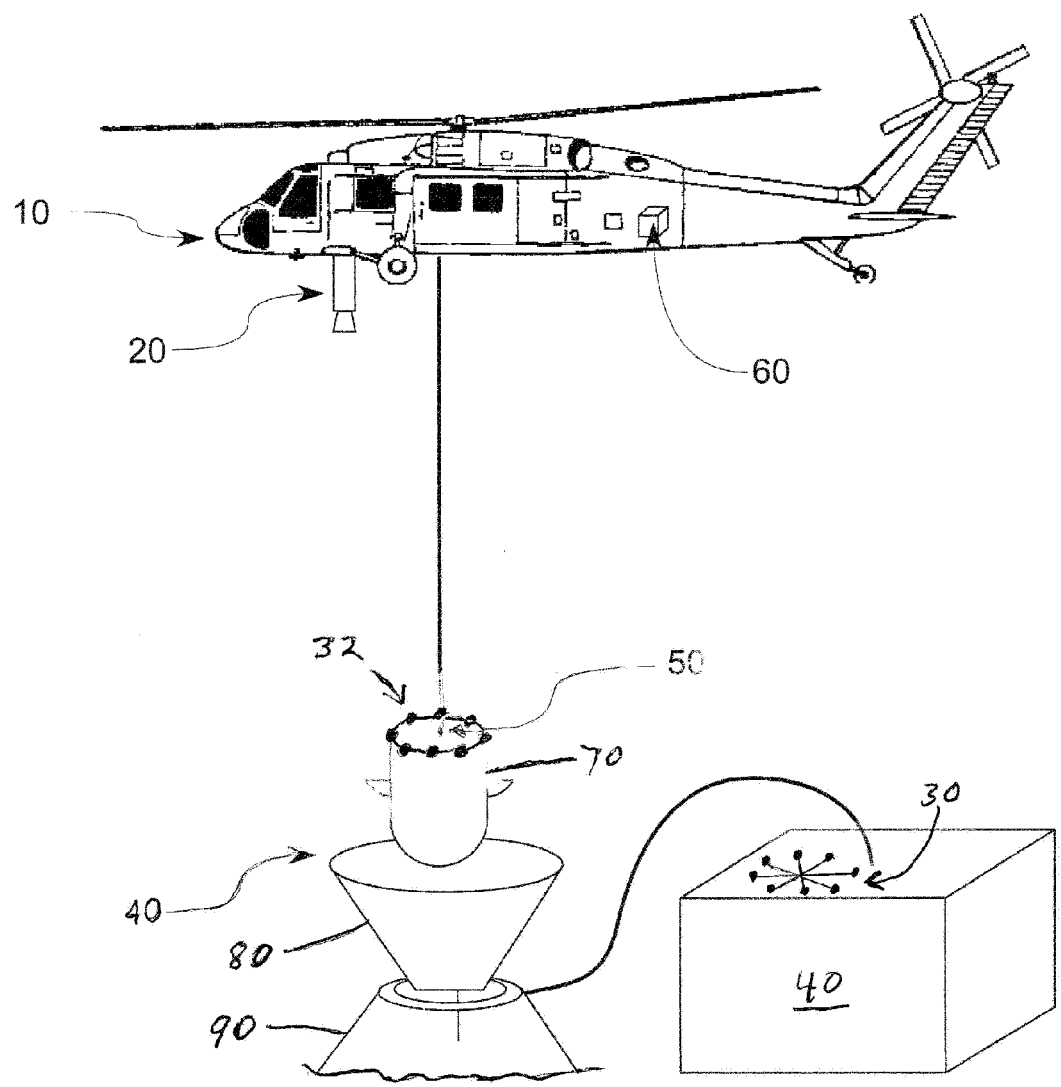
FIG. 7 diagrammatically shows another embodiment of the line tracking system.

In other embodiments, FIG. 7 illustrates a beacon 32 integrated into a grapple 70, such as a grapple similar to or the same as the grapple disclosed in Applicant's U.S. Pat. No. 8,643,850, issued Feb. 4, 2014, which is incorporated in its entirety by reference herein, and which mates with a load ring 90 attached to the load (FIGS. 7, 8) for engaging and holding the grapple as the load is lifted and transported. For guiding the grapple into engagement with the load ring, a funnel or funnel-like mechanism 80 may be provided at the top of the load ring. The load ring 90 is attached to load 40 in a conventional manner, as by a net, sling or the like supporting the load, the net, sling or the like attached to load ring 90, as by providing attachment points on load ring 90 for hooks, chains, cords, webbing or any other supporting apparatus for supporting the load from the load ring. By attaching beacon 32 directly to the grapple, and a second beacon 30 on the load, beacons 30, 32 can be observed directly, and the calculations of FIGS. 4, 5 performed by taking into account a known distance and direction of an offset between beacon 30 associated with the load and beacon 32 associated with the grapple or other lifting device. Further, calculations related to rotation of the load about the lifting point are eliminated by locating beacon 32 on grapple 70. Also, as described above, beacon 32 on grapple 70 need not be circular, it may be any shape, such as triangular or square, and may include any number of lights and their modes of operation as described above.

Figure 8:
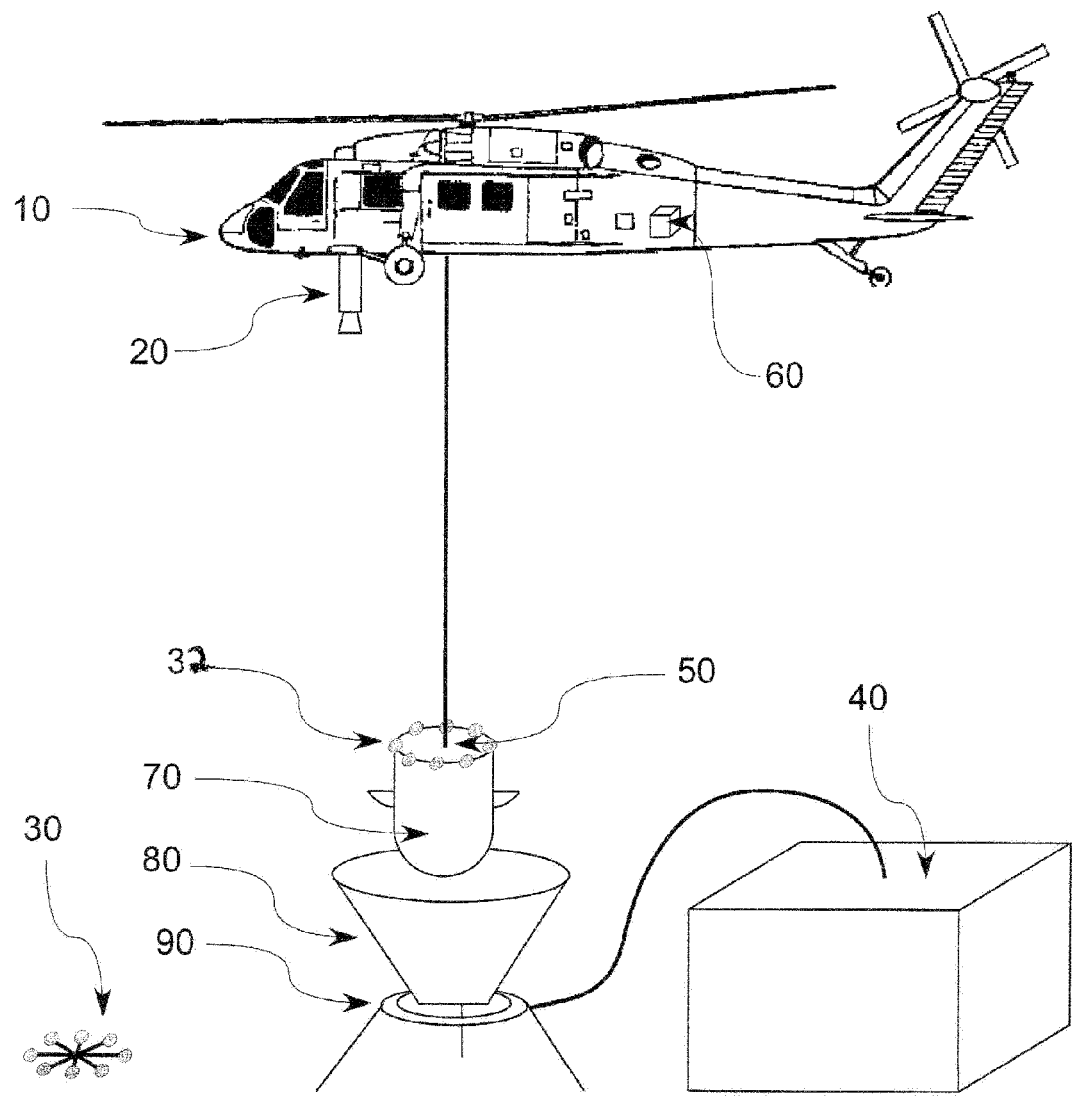
FIG. 8 diagrammatically shows another embodiment of the line tracking system.
Figure 9:
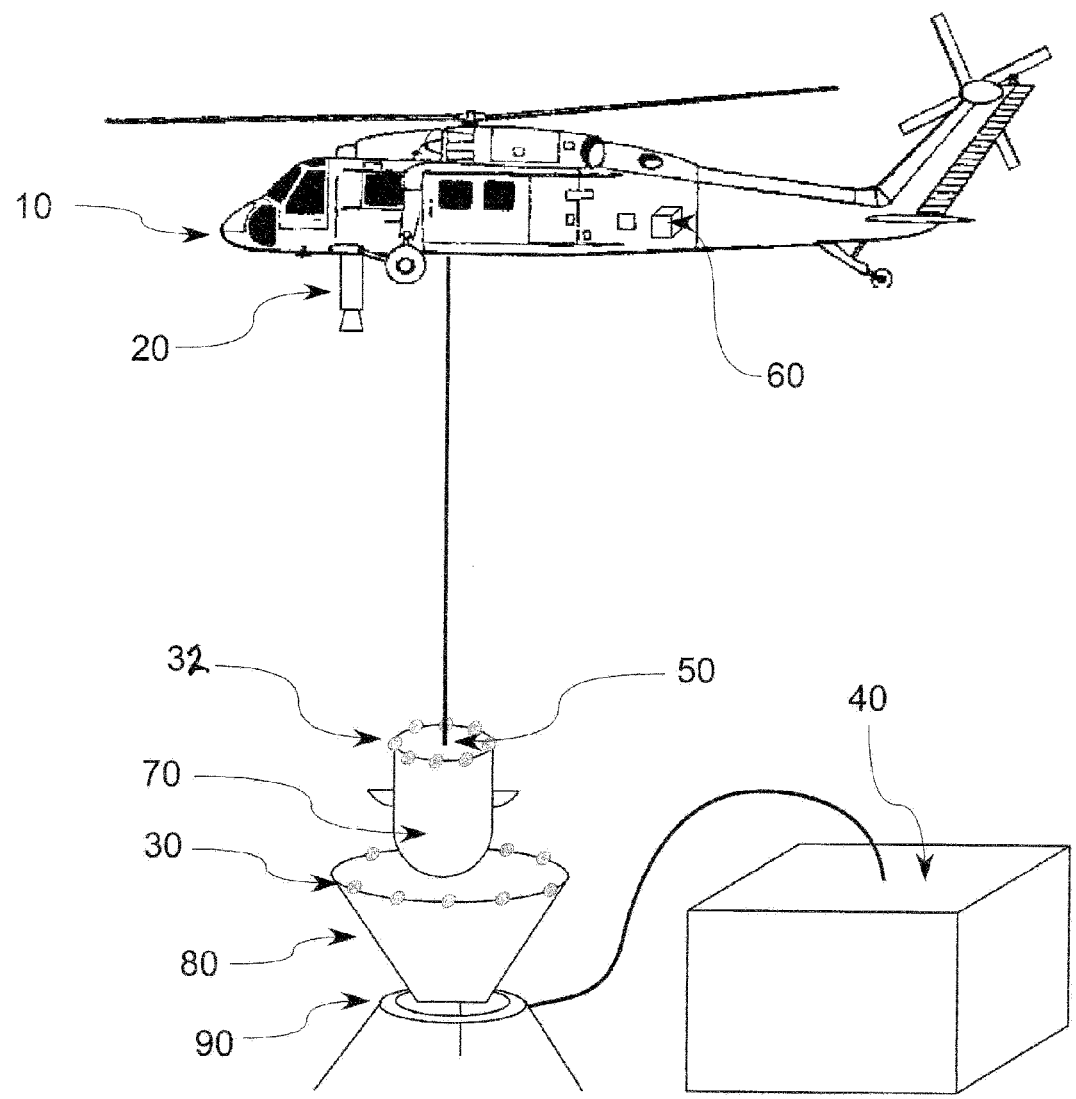
FIG. 9 diagrammatically shows another embodiment of the line tracking system.

In another embodiment, and as shown in FIG. 8, one or more beacons 30, in addition to beacon 32, may be placed on a surface near the load in order to facilitate engaging and lifting the load using grapple 70 and load ring 90. Here, calculations in processor 60 would generate control signals to the helicopter in order to guide grapple beacon 32 to funnel 80 using a known offset distance and direction between beacon 30 associated with load 40 and beacon 32 associated with grapple 70. As such, beacon 30 is a load location beacon, and beacon 32 is a hook location beacon. The hook location beacon defines hook angle. Once engagement occurs between the grapple and load ring, beacon 30 may be switched "off" and processor 60 used to control swinging of the load as described above. In this embodiment, processor 60 initially tracks both beacons 30 and 32 to locate both funnel 80 and grapple 70 to allow grapple 70 to be positioned and lowered into funnel 80 for engagement of the grapple with load ring 90. In another embodiment, as shown in FIG. 9, beacon 30 is integrated with the funnel in a known manner, such as around the rim of the funnel. This embodiment also simplifies calculations in that the need for taking an offset into account is eliminated. All that is required is to calculate an error signal between the beacons on grapple 70 and funnel 80, and generate control signals to the helicopter that drive the helicopter to cause coaxial alignment of the two beacons. In the embodiments of FIGS. 7, 8 and 9, swinging of grapple 70 would be first eliminated, and then the helicopter driven to engage the funnel and load ring.

Figure 10:
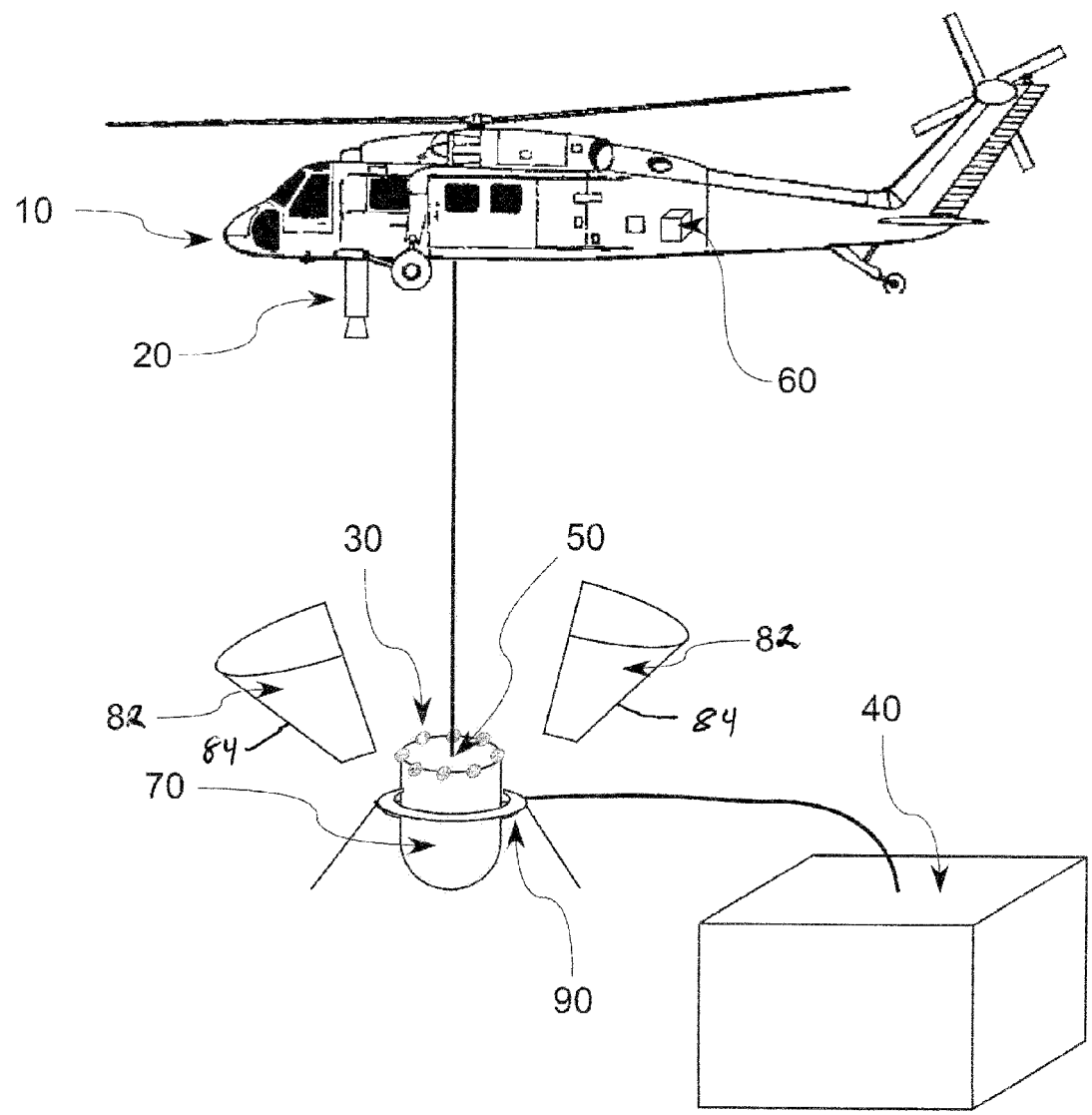
FIG. 10 diagrammatically shows another embodiment of the line tracking system.

In another embodiment, as shown in FIG. 10, a funnel 82 is designed to separate from load ring 90 and fall away after guiding grapple 70 to the load ring 90. Such separation would typically be facilitated by triggers and latches operated either electrically or mechanically such that when locking engagement between grapple 70 and load ring 90 occurs, portions 84 that make up funnel 82 separate and fall away from load ring 90. In these embodiments, a beacon 32 as shown in FIG. 8 may be placed in known relation with respect to load ring 90, or integrated into portions 84 so that location of funnel 82 is visible to sensor 20.

In other embodiments, it should be apparent that a manual operation wherein the load is manually attached or manually detached from line 50 would also benefit from Applicant's system. Here, the system would function to stop swinging motion of a hook, clevis, grapple or other load-engaging device handled by a ground crew. Also, Applicant's system would function to stop the swinging motion of a load before the load was lowered to the ground or other surface where a ground crew would manually disengage the load.

Figure 14:
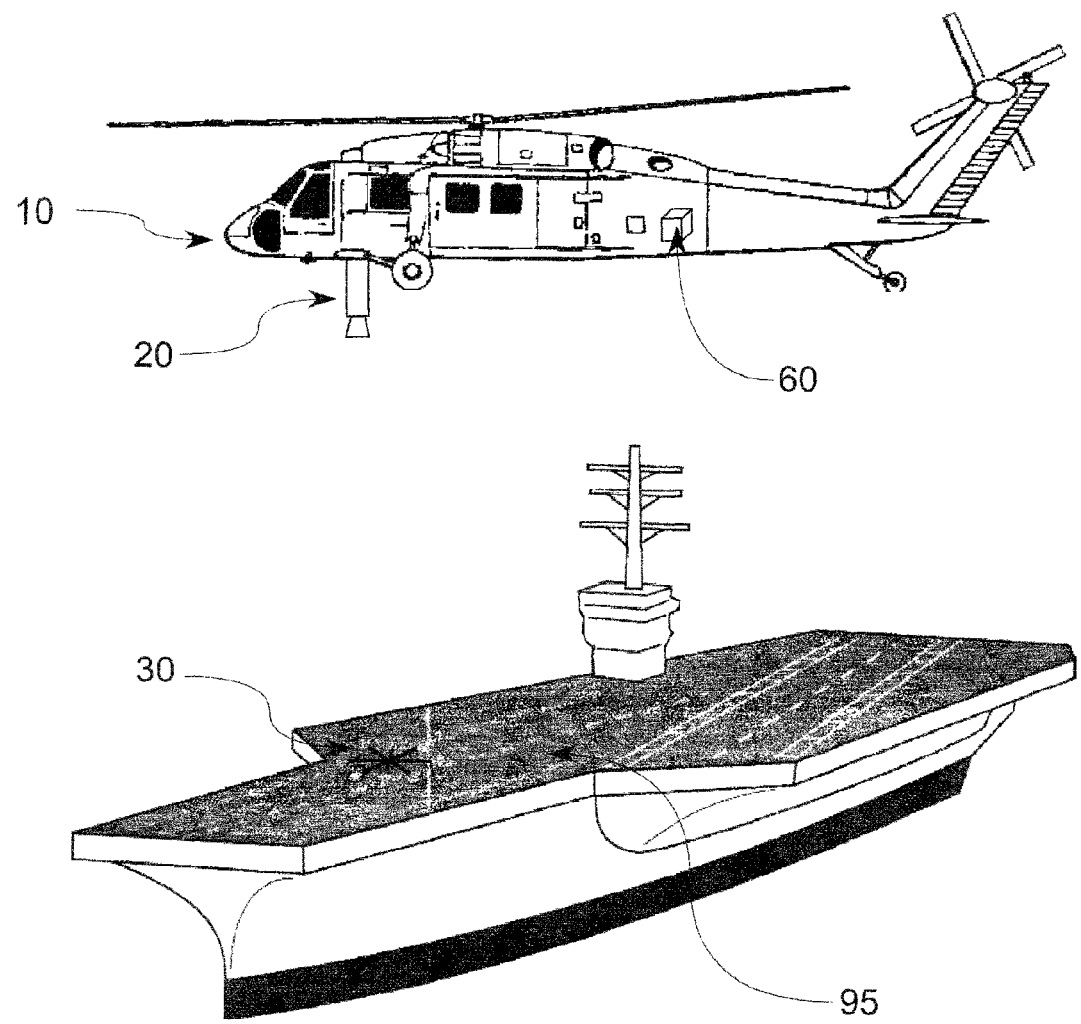
FIG. 14 diagrammatically illustrates one use of the invention.

In another embodiment, and as shown in FIG. 14, a beacon 30 may be placed on a surface 95, such as a deck or landing pad of a ship, building or other structure or surface, to which a helicopter 10 can be directed for landing at a precise location. In the instance where the landing platform is on a ship, processor 60, rather than preventing a load or grapple from swinging, would simply sense the motion of the ship as swinging of a load and match the motion of the helicopter to the motion of the ship.

In another embodiment, sensor 20 may be similar or the same as the sensor found in Applicant's patent application Ser. No. 12/932,664, which is also a non-imaging embodiment, and uses signal demodulators to determine a code chosen from code store 1010 that is broadcast by the lights of beacon 30. If the code is a frequency, the demodulator is a lock-in amplifier, known in the art. If the code is a pseudorandom sequence, the demodulator includes a correlator, also as known in the art. One to all of codes 1010 can be used to identify and locate beacon 30 from other sources of light in the field of view of the sensor, such as reflected sunlight or other bright spots or areas. This improves performance of the sensor. Codes emitted by a beacon on a load can be used to identify a particular load 40 from other loads with similar beacons thereon and distinguish the beacon associated with load 40 from the beacon associated with grapple 70.

In other embodiments, multiple demodulators can be applied to the output of each of the four quadrants of a quadrant detector 145 (FIG. 11). This yields data in which the location of each light source 210 is measured independently, and relative location is measured in full six degrees of freedom.

In other embodiments of the sensor, the quadrant detector of FIG. 11 can be used for both tracking and identification of load 40. In addition, the quadrant detector of FIG. 11 can also be used to detect multiple beacons 30 where the sources of light 210 for the beacons 30 are modulated with complex codes such as the Kasami codes, as disclosed in Applicant's U.S. Pat. No. 8,643,850, issued Feb. 4, 2014, and which is incorporated in its entirety herein. The sensor detects the beacons using asynchronous Code Division Multiplex Access (CDMA) algorithms, which are well known in the art. The sensor and processing algorithms can deal with the "near-far" problem, where some beacons are closer (and thus brighter) than others and can drown out the other, by (for example) digitally subtracting out the larger signals, leaving the smaller signal to process. This method is known as Subtractive Interference Cancelation in literature. Other approaches, such as using linear transforms to apply all available information to improve the estimate of waveform phase and amplitude, are known in the art.

In yet other embodiments of a sensor, the imaging version of sensor 20 can be used to detect multiple beacons 30 by grouping spots by similar size and nearness to each other to identify which spots belong to which beacon. Spots may be grouped by algorithms such as RANSAC, support-vector machines, or other known algorithms. Once the spots have been grouped into separate beacons, each beacon's spots are fed into the function 450 or function 1150.

Figure 13:
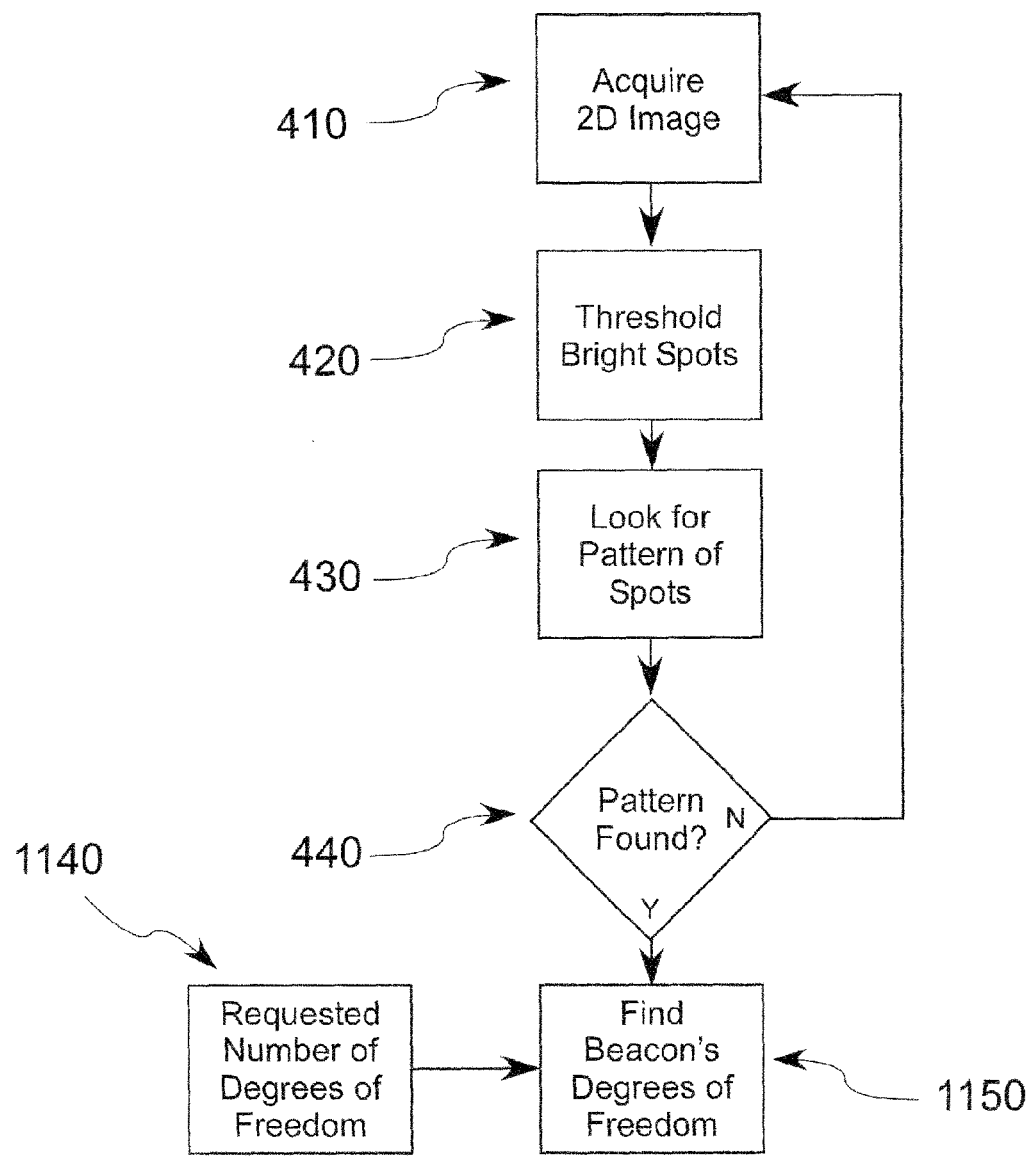
FIG. 13 shows, by way of example, a block diagram of the algorithm of FIG. 4 that allows the processor to determine more than just the two angles to the beacon.

In another embodiment of a processor, FIG. 13 shows an alternate algorithm to the one shown in FIG. 4. Given a requested number of degrees of freedom (from two to six) from function 1140, Function 1150 determines that degree-of-freedom information about the beacon 30. For instance, it can determine three degree of freedom information about the beacon such as the two angles that describe its location and the range to the beacon. It can determine the six-degree-of-freedom information such as the beacon's three-dimensional location and the three angles that describe how it is oriented.

In the embodiment of FIG. 7, the system is used to guide a grapple 70, such as the same or similar grapple and receiver disclosed in Applicant's U.S. Pat. No. 8,643,850, which as noted is incorporated herein in its entirety by reference, to mate with a load ring 90 that is attached to a funnel 80. The processor 60 tracks the location of beacon 32 on the grapple 70 and guides helicopter 10 to put the grapple 70 in the funnel 80, which guides grapple 70 into locking engagement with load ring 90. In the system shown in FIG. 8, at least one additional beacon 30 is placed next to the funnel 80, either on a surface next to the load or on the load, and allows the processor 60 to locate funnel 80 with sufficient accuracy to guide the grapple 70 to drop into the funnel 80. In the system shown in FIG. 9, an additional beacon 30 is integrated into the rim or other portions of funnel 80, so that no separate additional beacon 30 is required on the surface the load is sitting on or on load.

In another embodiment, the grapple 70, funnel 80 and load ring 90 are replaced with a manual hook and clevis that are engaged with a load by a ground crew, as is currently used in aviation and construction. The sensing and control system is still used to place the more conventional hook in the proper place, allowing safer and faster engagement of the hook and clevis by the ground crew.

In the embodiment of FIG. 14, the load 40 and end of line 50 are replaced by a surface 95 on which to land, such as a ship deck or a runway. The system is used to guide helicopter 10 to landing by measuring the position of the beacon 30 as placed on the landing surface 95. The beacon 30 position and motion (and thus that of the landing surface 95) are used to land helicopter 10 on the landing surface 95. In this embodiment, either the two-degree-of-freedom processor as shown in FIG. 4, a three-to six-degree-of-freedom measurement processor as shown in FIG. 13 is used to measure the beacon 30 position, orientation and motion.

Figure 15:
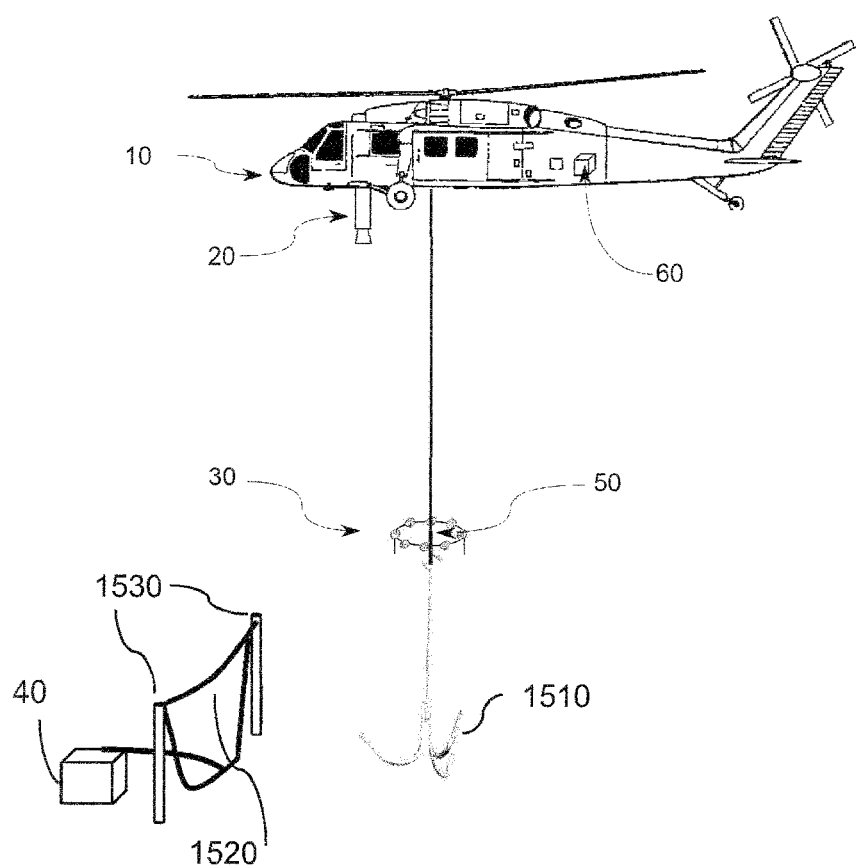
FIG. 15 diagrammatically illustrates another embodiment of a grapple and receiver of the invention.

In the embodiment of FIG. 15, the grapple is replaced with a grappnel 1510, and which has a plurality of load lifting hooks, typically dispose about its center. A loop of line supported between two points, such as poles 1530 or the like, is attached to the load. A beacon 30 is attached to the line near the grappnel, and which as described earlier, is guided into engagement with the loop of line by control signals developed by the sensor 20 and processor 60 of the system.

In any of the disclosed embodiments, it should be apparent that where a light-sensing pixel array is employed as a sensor, the extent to how well swinging of the load and placing an automated grapple in a funnel attached to a load ring may be dependent on resolution of the light-sensing array. As such, the choice of arrays should be apparent to those skilled in the art and familiar with design requirements of the invention. With respect to selection of an array, it is noted that currently, pixel arrays of 5 megapixels to 12 megapixels are found in cellular telephones. Combined with the proper optics with a suitable field of view, which may be telescopic and of a widened field of view, such arrays should work well in the instant invention, although smaller or larger arrays would also work, depending on the choice of optics.

Having thus described our invention and the manner of its use, it should be apparent that incidental changes may be made by those skilled in the relevant arts that fairly fall within the scope of the following appended claims, wherein we claim:

1. A method for controlling movement of a suspension member such as a rope, cable, sling, net or the like, said suspension member connected at one end to a load lifting and transporting apparatus and having an opposite end configured to connect to and carry a load, said method comprising:
   providing a suspension member beacon generally at said opposite end of said suspension member,
   providing a beacon location sensor on said load lifting and transporting apparatus,
   using said beacon location sensor to observe said suspension member beacon and detect location of said suspension member beacon in a field of view of said beacon location sensor,
   using an electronic processor, calculating a difference in location between an instant location of said suspension member beacon in said field of view of said beacon location sensor and a desired location of said suspension member beacon in said field of view of said beacon location sensor.

2. The method of claim 1 wherein said calculating a difference in location further comprises aligning said field of view of said beacon location sensor to at least one axis of movement of said load lifting and transporting apparatus.

3. The method of claim 2 further comprising providing electrical signals from said electronic processor responsive to said calculating a difference in location, said electrical signals indicative of swinging motions of said suspension member.

4. The method of claim 3 further comprising using said electrical signals to dampen said swinging motions of said suspension member.

5. The method of claim 4 wherein said using said electrical signals to dampen said swinging motions of said suspension member further comprises using said electrical signals to generate control signals, and using said control signals to automatically control movement of said load lifting and transporting apparatus in order to automatically dampen said swinging motions of said suspension member.

6. The method of claim 3 further comprising orienting a field of view of said beacon location sensor so that said suspension member beacon is in a center of said field of view when said suspension member is hanging vertically from said load lifting and transporting apparatus.

7. The method as set forth in claim 6 wherein said providing electrical signals from said electronic processor further comprises calculating direction and extent of said swinging motions, and further comprises:

determining a length of excursions of said suspension member beacon from said center of said field of view of said beacon location sensor, from said length of said excursions, calculating a first angle of said suspension member representative of extent of swing of said suspension member, determining locations of said excursions relative to said at least one axis of movement of said load lifting and transporting apparatus, from said locations of said excursions relative to said one axis of movement, calculating a second angle representative of direction of said swing of said suspension member, calculating error signals representative of said extent of swing and said direction of swing of said suspension member relative to said center of said field of view of said beacon location sensor.

8. The method of claim 7 further comprising developing control signals from said error signals and providing said control signals to said load lifting and transporting apparatus, for automatically moving said load lifting and transporting apparatus in directions to dampen said swinging motions of said suspension member.

9. The method of claim 6 further comprising:
using an image capture device having pixels as said beacon location sensor, said pixels arranged in a coordinate system,
referencing at least one axis of said coordinate system of pixels to said at least one axis of movement of said load lifting and transporting apparatus.

10. The method of claim 9 further comprising:
providing at least one reference length on said beacon,
using said beacon location sensor to detect said at least one reference length.

11. The method of claim 10 further comprising determining extent of said swinging motions by comparing a number of said pixels in said swinging motions with a number of said detection pixels in said known reference length.

12. The method as set forth in claim 11 further comprising determining direction of said swinging motions of said suspension member with respect to said at least one axis of movement of said load lifting and transporting apparatus, and generating electrical signals representative of said extent of said swinging motions and said direction of said swinging motions.

13. The method of claim 12 further comprising using said electrical signals representative of said extent of said swinging motions and said direction of said swinging motions to develop control signals, for automatically dampening said swinging motions of said suspension member.

14. The method of claim 1 further comprising providing a plurality of lights on said suspension member beacon, said plurality of lights detected by said beacon location sensor.

15. The method of claim 14 further comprising mounting said suspension member beacon on an automated grapple at said opposite end of said suspension member, said automated grapple configured for automatically connecting to said load.

16. The method of claim 15 further comprising modulating at least one light of said plurality of lights in a predetermined pattern, and detecting said at least one modulated light using said bacon location sensor.

17. The method of claim 16 further comprising detecting orientation and position of said load from a detected said modulated at least one of light.

18. The method of claim 17 further comprising:
using a plurality of lights on at least said suspension member beacon, for locating said suspension member beacon,
modulating at least one light of said plurality of lights in a predetermined pattern,
detecting a modulated said at least one light of said plurality of lights,
from a detected modulated said light, determining both orientation and position of said load.

19. The method of claim 16 further comprising:
mounting an automatic grapple for automatically connecting to a load at an end of said suspension member,
mounting a load-bearing interface to said load for receiving said automatic grapple and engaging therewith, for enabling said load lifting device to lift said load,
positioning a load beacon in known relation with said load-bearing interface,
using said image capture device to detect locations of both said suspension member beacon and said load beacon,
using said electronic processor, generating electrical signals to reduce distance between said automatic grapple and said load bearing interface until said automatic grapple engages said load bearing interface.

20. A method for controlling movement of a suspension member such as a rope, cable, sling, net or the like, said suspension member connected at one end to a moving lifting device and having an opposite end configured to connect to and carry a load, said method comprising:
providing a suspension member beacon generally at said opposite end of said suspension member,
providing an image capture device on said moving lifting device,
using said image capture device to observe said suspension member beacon and detect a location of said suspension member beacon within a field of view of said image capture device,
using an electronic processor, calculating deviation of said suspension member beacon from a desired location responsive to a detected location of said suspension member beacon.

* * * * *